United States Patent
Malzahn et al.

(10) Patent No.: US 9,003,116 B2
(45) Date of Patent: Apr. 7, 2015

(54) PROTECTED MODE FOR GLOBAL PLATFORM COMPLIANT SMART CARDS

(75) Inventors: Ralf Malzahn, Seevetal (DE); Francesco Gallo, Graz (AT)

(73) Assignee: NXP B.V., Eindhoven (NL)

( * ) Notice: Subject to any disclaimer, the term of this patent is extended or adjusted under 35 U.S.C. 154(b) by 215 days.

(21) Appl. No.: 13/513,811

(22) PCT Filed: Dec. 18, 2009

(86) PCT No.: PCT/IB2009/055845
§ 371 (c)(1), (2), (4) Date: Jun. 4, 2012

(87) PCT Pub. No.: WO2011/073734
PCT Pub. Date: Jun. 23, 2011

(65) Prior Publication Data
US 2012/0246404 A1    Sep. 27, 2012

(51) Int. Cl.
*G06F 12/14* (2006.01)
*G07F 7/10* (2006.01)
*G06Q 20/34* (2012.01)

(52) U.S. Cl.
CPC .......... *G07F 7/1008* (2013.01); *G06F 12/1433* (2013.01); *G06Q 20/341* (2013.01); *G06Q 20/3563* (2013.01); *G06Q 20/3576* (2013.01)

(58) Field of Classification Search
CPC ... G06F 3/0679; G06F 21/77; G06F 12/1433; G06Q 20/341
USPC .................................................. 711/115, 163
See application file for complete search history.

(56) References Cited

U.S. PATENT DOCUMENTS

| | | | |
|---|---|---|---|
| 7,191,288 B2 * | 3/2007 | de Jong | 711/115 |
| 7,845,567 B2 | 12/2010 | Chan et al. | |
| 2004/0088562 A1 * | 5/2004 | Vassilev et al. | 713/200 |
| 2009/0287935 A1 * | 11/2009 | Aull et al. | 713/182 |

(Continued)

FOREIGN PATENT DOCUMENTS

| | | | |
|---|---|---|---|
| CN | 101196877 A | 6/2008 | |
| EP | 2 053 532 A1 | 4/2009 | |
| EP | 2053532 * | 4/2009 | G06F 21/00 |

(Continued)

OTHER PUBLICATIONS

"Atmel 32-bit Secure Microcontrollers: AT91SC464384RCU Summary", 5 pgs., retrieved from the Internet Aug. 25, 2010 at: http://www.atmel.com/dyn/resources/prod_documents/6546A_29Mar07.pdf (Mar. 27, 2007).

(Continued)

*Primary Examiner* — Than Nguyen

(57) ABSTRACT

A multiple application smart card (102) uses hardware firewalls (130) and an internal communications scheme to isolate applications from different service providers. A first application (116) from a first service provider is stored within a first supplemental security domain (SSD) (126) of a memory device on the multiple application smart card (102). A second application (116) from a second service provider is stored within a second SSD (128) of the memory device. A hardware firewall (130) is located between the first and second applications (116) of the first and second SSDs (128). The hardware firewall (130) prevents direct data access between the first and second applications (116) of the first and second SSDs (128).

20 Claims, 7 Drawing Sheets

(56) References Cited

U.S. PATENT DOCUMENTS

2010/0011007 A1* 1/2010 Bettger et al. ............... 707/10
2011/0239306 A1* 9/2011 Avni et al. ................... 726/26

FOREIGN PATENT DOCUMENTS

| WO | 2004/046925 A1 | 6/2004 | | |
|---|---|---|---|---|
| WO | WO2004046925 | * | 6/2004 | ............ G06F 9/46 |

OTHER PUBLICATIONS

"Runtime Environment Specification, Java Card Platform, Version 2.2.1", 116 pgs., retrieved from the Internet Mar. 10, 2006 at: http://java.sun.com/products/javacard/specs.html (Oct. 2003).

International Search Report for Patent Application No. PCT/IB2009/055845 (Sep. 7, 2010).

* cited by examiner

PROTECTED MODE FOR GLOBAL PLATFORM COMPLIANT SMART CARDS

BACKGROUND

Smart cards are pocket-sized cards with integrated circuits that hold one or more software applications. Multiple application smart cards are useful because several applications can be implemented on the same smart card. However, the presence of multiple applications on the same smart card also results in difficulty coordinating how the applications coexist and execute. This problem is amplified when applications from different service providers are put on the same smart card.

Multiple application smart cards typically use a software firewall to prevent interference among smart card applications from different service providers. However, the card issuer is responsible for verifying that the different applications work together. Also, legal agreements might be required between the card issuer and the service providers, and between the service providers themselves. This coordination using software firewalls, card issuer verification, and legal agreements can quickly become difficult and expensive as more and more applications from different service providers are put onto the same smart card.

SUMMARY

An improved smart card is able to manage applications from different service providers while limiting the amount of coordination. Applications from different service providers are implemented by corresponding slave operating systems (OSs) in distinct supplemental security domains (SSDs), which are separate from the issuer security domain (ISD) for the card issuer. A master OS implemented for the ISD has exclusive control over the communications within the smart card, and all communications pass through the master OS. Also, hardware firewalls may be implemented to separate and prevent data access among the distinct SSDs and the ISD. Allowing the master OS to control all of the internal communications and using hardware firewalls to prevent accidental or unauthorized data transactions between SSDs and/or between an SSD and the ISD prevents the service provider applications from disrupting other applications, SSDs, or the ISD.

Other aspects and advantages of embodiments of the present invention will become apparent from the following detailed description, taken in conjunction with the accompanying drawings, illustrated by way of example of the principles of the invention.

BRIEF DESCRIPTION OF THE DRAWINGS

Throughout the description, similar reference numbers may be used to identify similar elements.

DETAILED DESCRIPTION

Figure 1:
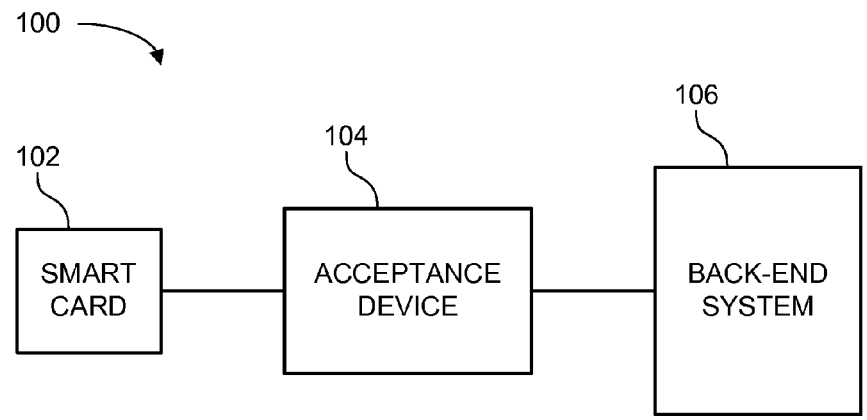
FIG. 1 depicts a schematic block diagram of one embodiment of a smart card infrastructure.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

The description herein uses acronyms and/or abbreviations for ease and clarity in describing embodiments of the invention. The acronyms and/or abbreviations used herein are understood to be general references to one or more embodiments, and are not limited to describing a particular embodiment or feature exclusive of other embodiments or features. Also, the use index numbers or variables which are appended to the acronyms/abbreviations (e.g., OS1, OS2, etc.) merely represents multiple instances of the indicated structure or function—the use of such indices do not require or limit a particular embodiment to the indicated number of structures or functions. Some of the common acronyms/abbreviations used herein include:

TSM: trusted (or trust) service manager;
ISD: issuer security domain;
SSD: supplementary security domain;
OS: operating system;
ROM: read-only memory;
OTP: one-time programmable;
EEPROM: electrically erasable programmable read-only memory;
RAM: random-access memory;
APDU: application protocol data unit;
API: application program interface; and
PIN: personal identification number.

While many embodiments are described herein, at least some of the described embodiments facilitate the correct working of a multiple application smart card issued by a TSM which checks that an application from a service provider does not interfere with an application from other service providers. More specifically, the TSM ensures within a GlobalPlatform environment that it is not possible for an application of one SSD to interfere with an application of another SSD. Similarly, the TSM may provide the same or similar functionality in another standardized environment other than GlobalPlatform or in another environment which uses multiple application smart cards.

In a particular embodiment, an approach is provided to avoid the interference between applications, thus guaranteeing the complete decoupling of the applications. In the case of a crashed application of a service provider, the smart card is still able to run together with the applications of the other service providers. In this manner, multiple application smart cards can be implemented to operate in such critical situations with reduced checks by the TSM at the card supplier side and reduced coordination for legal agreements among the TSM and the service providers. Hence, using embodiments described herein allows the TSM to forego some or all checks and agreements other than 1) to check if the applications of each specific service provider work correctly in the smart card environment of the card issuer, and 2) to set up the legal agreement that may be needed between card issuer and service provider. Consequently, legal agreements between service providers may be unnecessary.

FIG. 1 depicts a schematic block diagram of one embodiment of a smart card infrastructure 100. The illustrated smart card infrastructure 100 includes a smart card 102, an acceptance device 104, and a back-end system 106. Other embodiments of the smart card infrastructure 100 may include more than one of any of these components.

In general, the smart card 102 stores a functional application that interfaces with the acceptance device 104. Some examples of these functional applications include user authentication, access control, credit and debit transactions, and so forth. However, the embodiments described herein are not limited to a particular type of application.

One common type of acceptance device 104 is referred to as a card reader because the acceptance device 104 reads (i.e., receives) information stored on or generated by the smart card 102. Other embodiments may use other types of acceptance devices 104, including devices to write new data and/or applications to the smart card 102. In some embodiments, the acceptance device 104 interfaces with the back-end system 106 to coordinate user authentication and/or data transactions.

GlobalPlatform Specifications (http://www.globalplatform.org) provide one example of a standard for the smart card infrastructure 100. These specifications facilitate deployment of smart cards 102, acceptance devices 104, and back-end systems 106 to support single and multiple applications. For reference, a single application smart card 102 supports a single application. In contrast, a multiple application smart card 102 supports multiple applications from the same or different service providers. Traditionally, the owner of the application(s) was the card issuer. Thus, the card issuer was responsible to validate the proper operation of the application(s) on the smart card 102.

With increased use of multiple application smart cards 102, the application owners and the card issuers may be separate entities. In these situations, a new entity—the trust service manager (TSM)—is responsible to manage (e.g., load, install, lock, delete, etc.) the applications coming from different service providers.

Figure 2:
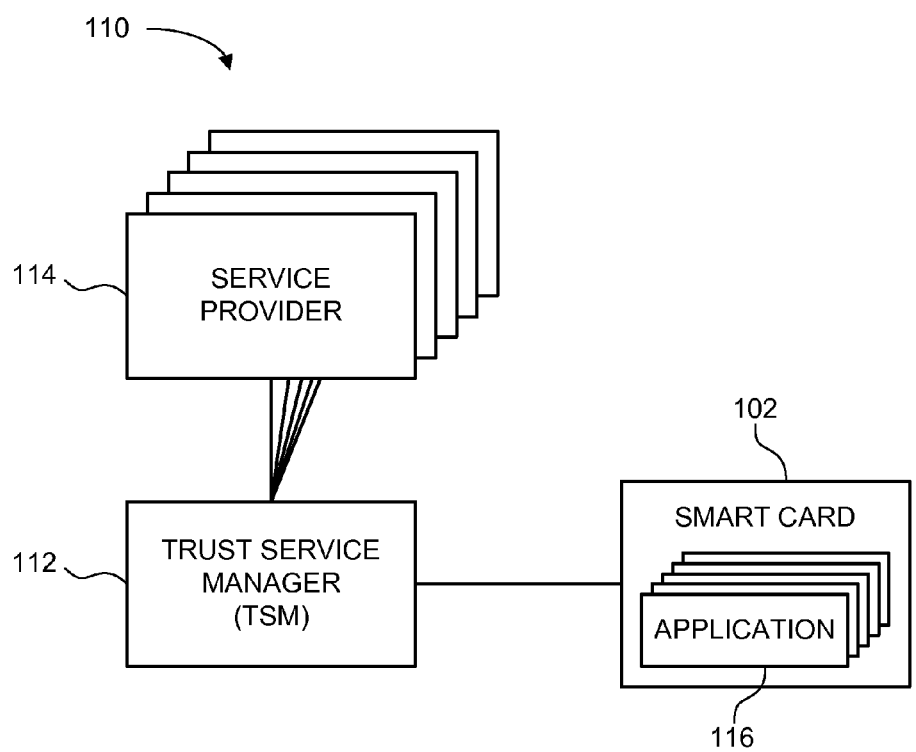
FIG. 2 depicts a schematic block diagram of one embodiment of the relationship among a multiple application smart card, a trust service manager (TSM), and multiple service providers.

FIG. 2 depicts a schematic block diagram of one embodiment of the relationship 110 among a multiple application smart card 102, a trust service manager (TSM) 112, and multiple service providers 114. For illustration purposes, the smart card 102 is shown with multiple, distinct applications 116. The TSM 112 manages the applications 116 that are developed by different independent service providers 114 such as credit card companies, transport authorities, and so forth.

In order to guarantee the correct operation of a multiple application smart card 102, the TSM 112 (or card issuer) should check that an application 116 from a service provider 114 does not disturb an application 116 from another service provider 114. For example, the TSM 112 should guarantee that an application 116 does not block the complete card 102 and, consequently, disrupt all stored applications 116.

Conventionally, in order to prevent interference among smart card applications, smart cards typically use a software firewall to guarantee that an application does not disturb the other applications. However, the card issuer still must verify that the different applications work fine together in the same smart card. This check can be relatively easy to do if the number of applications is small and the possible smart card configurations (i.e., which applications are present at the same time inside the smart card) are also limited. Also, from a legal perspective, in cases where several applications from different service providers are present inside the same smart card, several legal agreements might be required between the card issuer and the service providers, and between the service providers themselves. This can be feasible if the number of service providers and related applications are limited. While it may be relatively easy to manage the potential interference and legal agreements for a small number of applications on a smart card, the issues related to interference prevention and legal agreements can quickly become too big and expensive as more and more applications from different service providers are put onto the same smart card.

Figure 3:
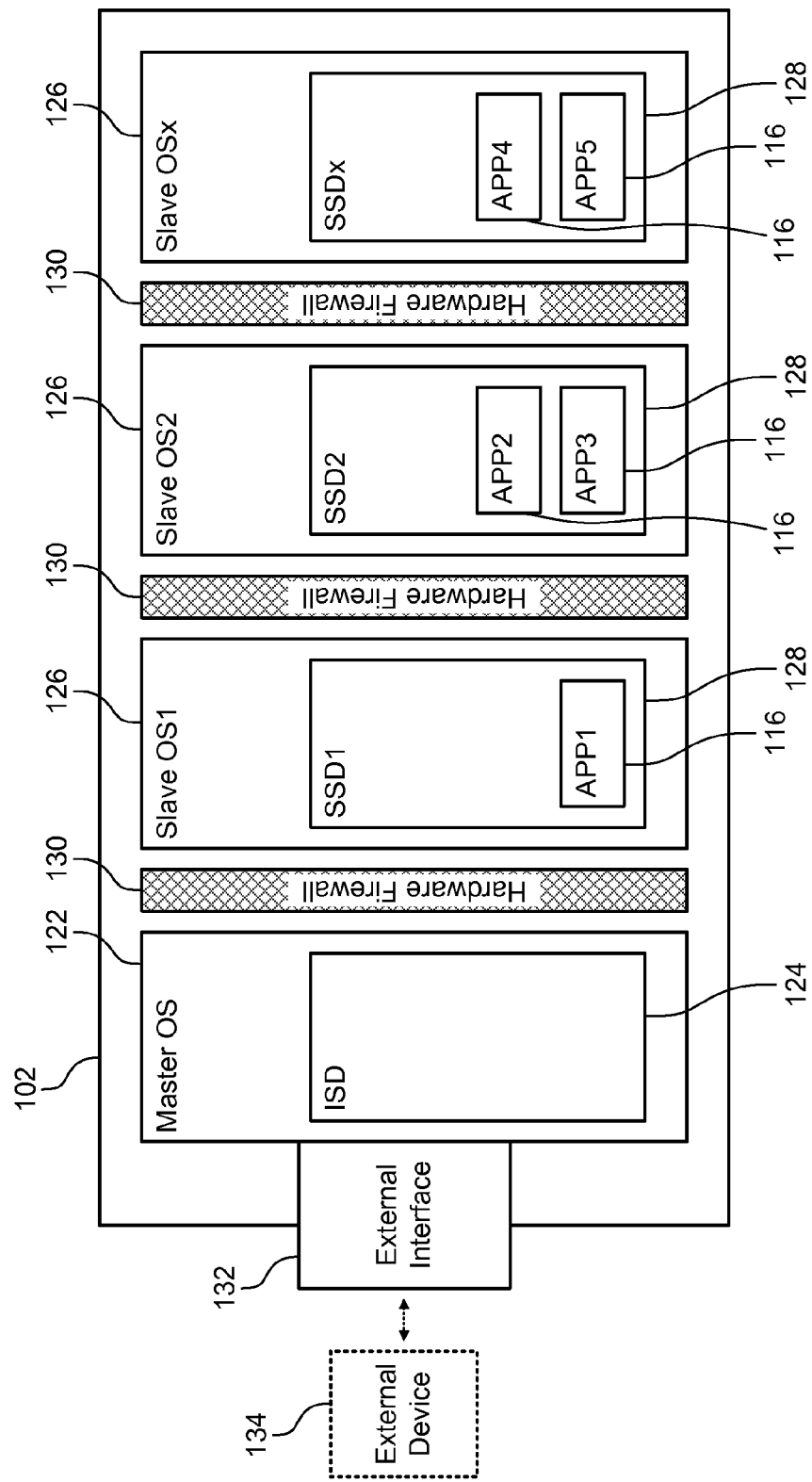
FIG. 3 depicts a schematic block diagram of one embodiment of functional components of a multiple application smart card.

FIG. 3 depicts a schematic block diagram of one embodiment of functional components of a multiple application smart card 102. Embodiments of the smart card 102 described herein overcome some or all of the problems of conventional smart cards. Although the smart card 102 is shown and described with certain components and functionality, other embodiments of the smart card 102 may include fewer or more components to implement less or more functionality.

In order to prevent interference by inaccurate, faulty, or malicious applications 116 from a service provider 114, and to reduce the number of application checks and legal agreements associated with conventional smart cards, the illustrated smart card 102 includes various memory segments to implement different operating systems (OSs) for different entities. In FIG. 3, these memory segments are illustrated by specific OSs.

In particular, the illustrated smart card 102 includes a master OS 122 which implements an issuer security domain (ISD) 124. The master OS 122 and ISD 124 correspond to the TSM 112 (i.e., the card issuer). The illustrated smart card 102 also includes several slave OSs 126 (designated as OS1, OS2, ... OSx) which implement corresponding supplemental security domains (SSDs) 128. In one embodiment, each of the master and slave OSs 122 and 126 runs, or operates, completely independently from the other OSs 122 and 126 within the smart card 102. Additionally, each slave OS 126 and corresponding SSD 128 can be reserved for a distinct service provider 114. In this way, each service provider 114 can install one or more applications 116 in their own SSD 128.

Initially, the TSM 112 is the owner of the ISD 124 and all SSDs 128. Thus, the TSM 112 has the secret keys of the ISD 124 and the SSDs 128. The TSM 112 gives the secret keys of an SSD 128 to a service provider 114 to download the applications 116 into the smart card 102. Alternatively, the TSM 112 can download the applications 116 on behalf of the service provider 114. Additionally, although not shown in FIG. 3, it is possible to store separate applications 116 on the ISD 124.

In the GlobalPlatform environment, it should not be possible for an application 116 of an SSD 128 to interfere with applications 116 of other SSDs 128. Also, it should not be possible for an application 116 of an SSD 128 to interfere with an application 116 of the ISD 124. Accordingly, the smart card 102 also includes hardware firewalls 130 to separate the slave OSs 126 from each other and from the master OS 122.

In general, hardware firewalls are mechanisms to separate memory regions. In some embodiments, the separation of the memory regions is accomplished by hardware circuitry which checks the range of each memory address used in application operations. As long as the memory address is in a certain range corresponding to the requesting application 116, the hardware circuitry allows the requested memory access. However, if the memory address is not in the range corresponding to the requesting application 116, then the hardware circuitry disallows the requested memory access and, in some embodiments, stops the application 116 and returns control back to the master OS 122 (e.g., TSM). In this way, the hardware circuitry observes what each application 116 is doing in terms of the requested memory accesses and stops any application 116 that violates the limits implemented in the hardware circuitry. The controlling entity (e.g., TSM) sets the limits for the address ranges before an application 116 is started and given control.

In addition to the implementation of the hardware firewalls 130, some embodiments of the smart card 102 implement an internal communication scheme, or protocol, to manage the internal communications of the smart card 102. In general, the internal communication scheme permits communications between each slave OS 126 and the master OS 122, but not between slave OSs 126 directly. For example, with reference to FIG. 3, the slave OS1 can communicate with the master OS 122, but the slave OS1 cannot communicate directly with the slave OS2 or any other slave OS 126. In other embodiments, the internal communication scheme can be implemented in a smart card without hardware firewalls.

Figure 6:
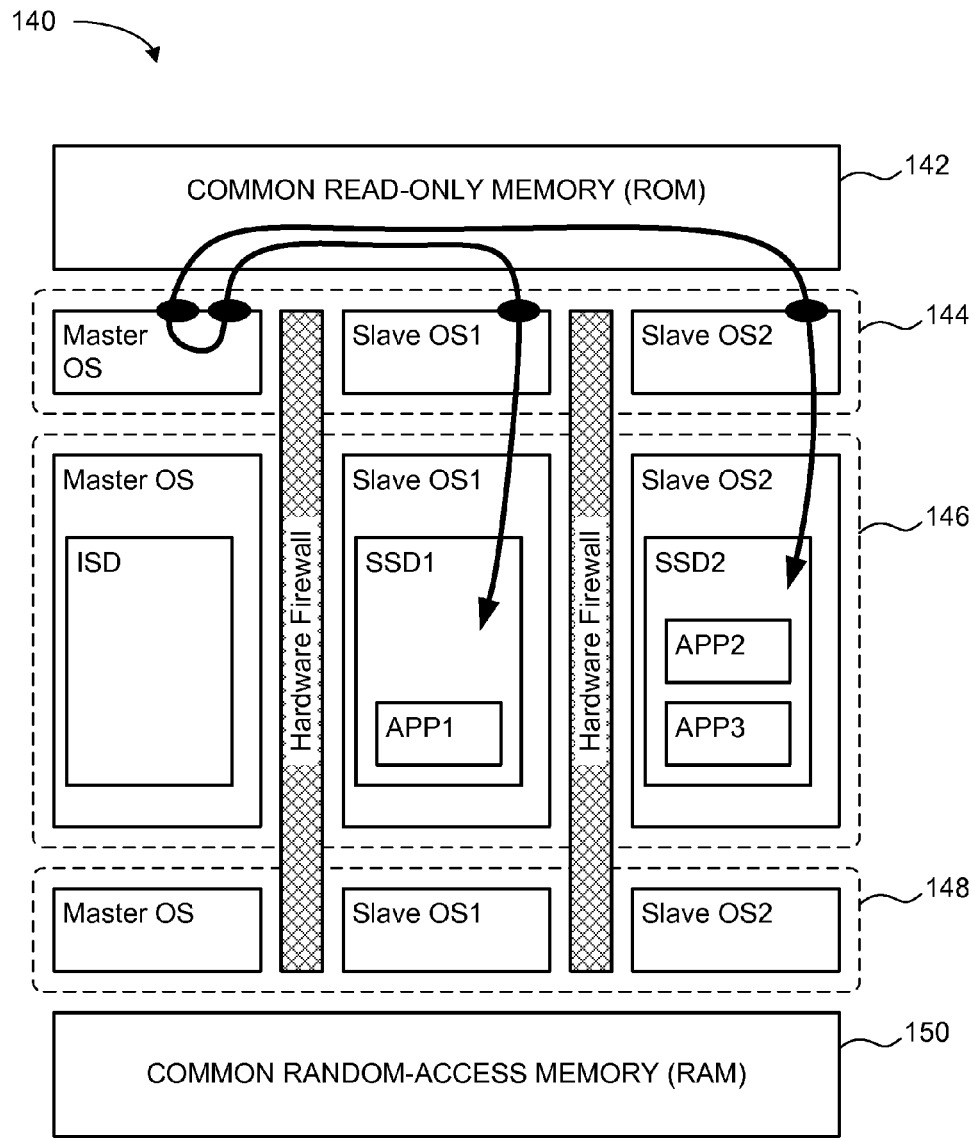
FIG. 6 illustrates an example of the transfer of control between the first slave OS1 and the second slave OS2 within the multiple application smart card of FIG. 3.

In one embodiment, the master OS 122 controls the communications between the slave OSs 126. Thus, the master OS 122 controls the internal communications between applications 116 on different SSDs 128. In this way, the interactions between the different slave OSs 126 and their applications 116 are restricted to indirect communications via the master OS 122. As one example, with reference to FIG. 3, the APP1 of the slave OS1 can only communicate with the APP2 of the slave OS2 via the master OS 122 by first communicating a message from the APP1 of the slave OS1 to the master OS 122 and then communicating the message from the master OS 122 to the APP2 of the slave OS2. Further details of this example are shown in FIG. 6 and described in more detail below with reference to that figure.

By allowing the master OS 122 to control all of the communications involving any of the slave OSs 126, the different OSs 122 and 126 are completely independent. Additionally, in some embodiments, the card issuer (e.g., TSM 112) only validates that the application(s) 116 of one SSD 128 (corresponding to a specific service provider 114) are working correctly together with the master OS 122 and its possible applications. The card issuer (e.g., TSM 112) does not need to validate that the application(s) 116 of each SSD 128 might work with the application(s) 116 of the other SSDs 128 because an application 116 cannot disturb an application 116 of another SSD 128 due to the hardware firewall 130 and/or the internal communication scheme controlled by the master OS 122.

In case an application 116 of an SSD 128 crashes the related slave OS 126, the complete smart card 102 does not necessarily crash and, consequently, the other slave OSs 126 with SSDs 128 and applications 116 can continue to operate. Thus, the master OS 122 can detect and deactivate the crashed slave OS 126 while keeping the other slave OSs 126 up and running. So the independence of the different service providers 114 is guaranteed in certain embodiments of the smart card 102 because the slave OS 126 for each service provider 114 can operate independently from the slave OSs 126 of other service providers 114. The service providers 114 and the corresponding slave OSs 126 are only dependent on the card issuer (e.g., the TSM 112) and the master OS 122.

Figure 5:
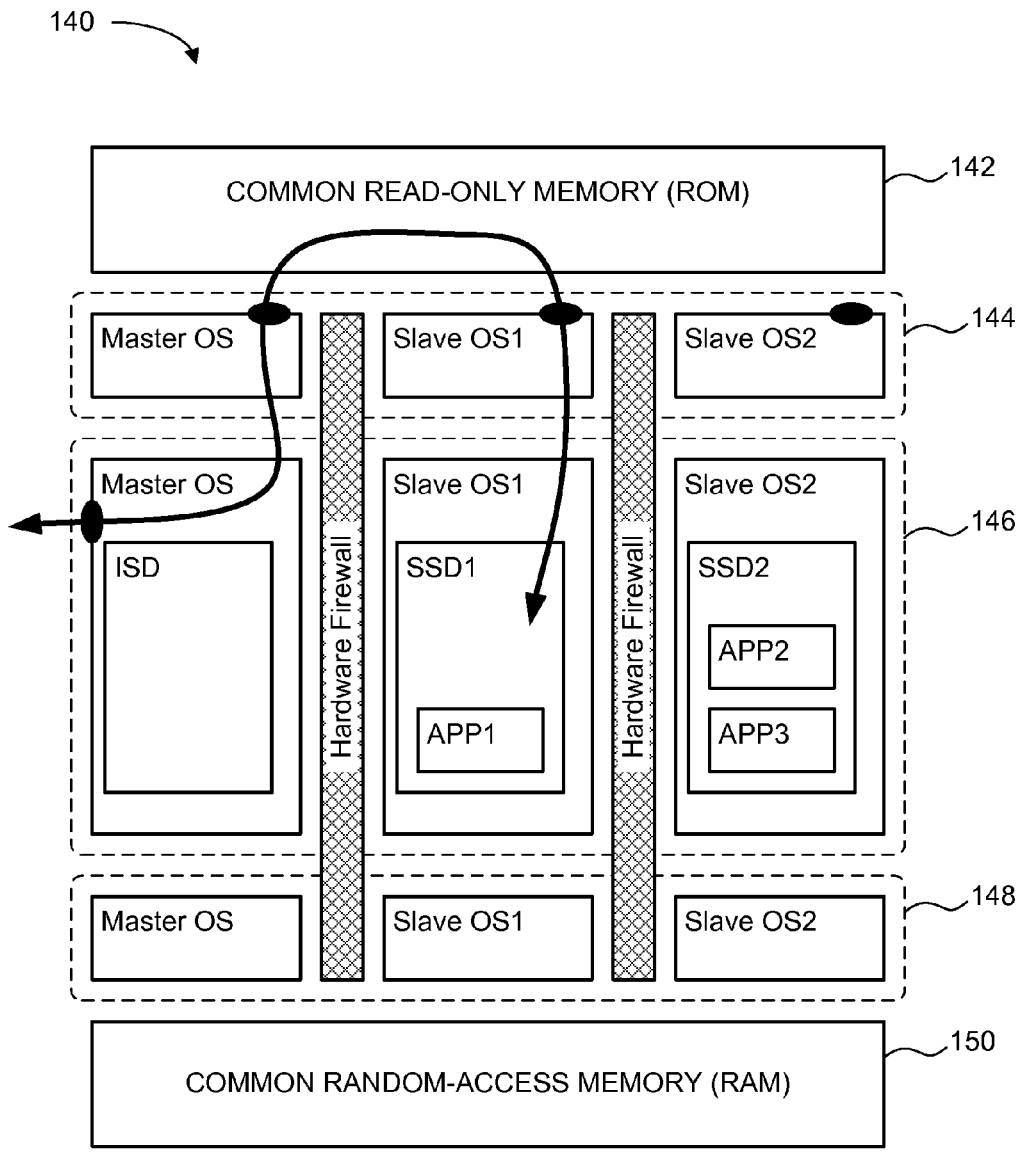
FIG. 5 illustrates an example of the transfer of control between the master OS and the first slave OS1 within the multiple application smart card of FIG. 3.

The master OS 122 also controls the communications between the slave OSs 126 and the external world (e.g., communications with an acceptance device 104). In one embodiment, the smart card 102 includes an external interface 132 that facilitates communications between the master OS 122 and an external device 134 such as an acceptance device 104. As one example, with reference to FIG. 3, the APP1 of the slave OS1 can only communicate with the external device 134 via the master OS 122 by first communicating a message from the APP1 of the slave OS1 to the master OS 122 and then communicating the message from the master OS 122 to the external interface 132 for delivery to the external device 134. Further details of this example are shown in FIG. 5 and described in more detail below with reference to that figure. This process is applicable to all application protocol data units (APDUs) exchanged with an external reader or other type of acceptance device 104.

Figure 4:
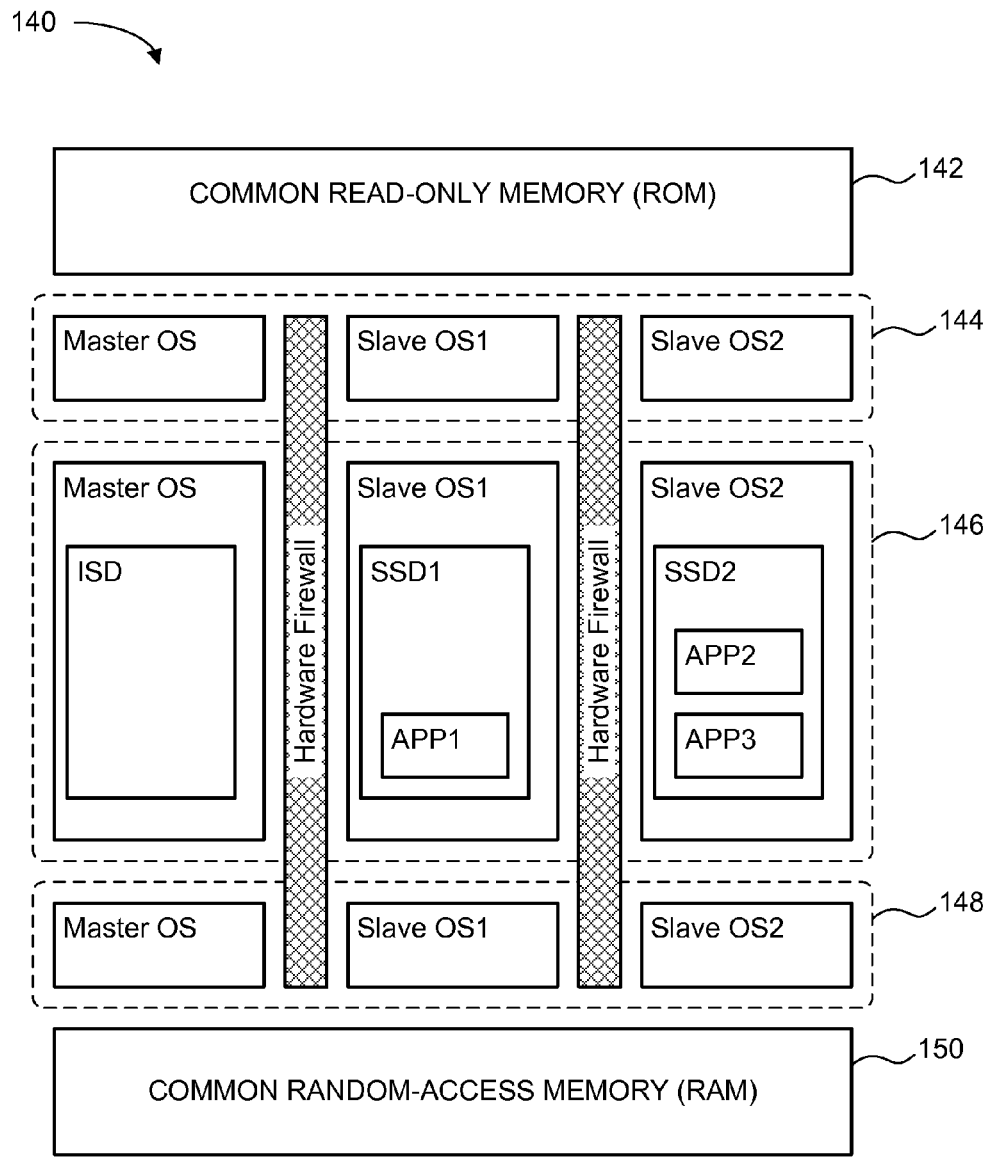
FIG. 4 depicts a schematic block diagram of the memory organization of the multiple application smart card of FIG. 3.

FIG. 4 depicts a schematic block diagram 140 of the memory organization of the multiple application smart card 102 of FIG. 3. In the illustrated embodiment, the master OS 122 and slave OSs 126 are distributed over various memory segments of one or more memory devices. In particular, FIG. 4 illustrates five different memory devices, including a common read-only memory (ROM) 142, an OS specific ROM 144, a programmable memory 146, an OS specific random-access memory (RAM) 148, and a common RAM 150. Other embodiments of the smart card 102 may use fewer or more memory devices, which may be arranged in similar or different ways. For reference, the common ROM 142 and the OS specific ROM 144 also may be referred to as one-time programmable (OTP) memory.

In one embodiment, the common ROM 142 contains common functionalities, shared application program interfaces (APIs), and common OTP areas used by the different OSs 122 and 126.

In one embodiment, the OS specific ROM 144 is a single memory device that is subdivided into separate memory segments separated by hardware firewalls 130. In another embodiment, the OS specific ROM 144 may include multiple separate memory devices. In general, each segment of the OS specific ROM 144 contains information specific to the corresponding master and slave OSs 122 and 126, regardless of whether the segments are implemented in the same or distinct memory devices.

In the case of the master OS 122, the OS specific ROM 144 includes functionality to manage the transmission and lower protocols using, for example, ISO/IEC 14443, ISO/IEC 7816, and USB protocols. Also, the OS specific ROM 144 for the master OS 122 includes the protocol error handling, the logical channel, the APDU filtering, and the messages dispatch (e.g., APDUs). Other embodiments may include additional functionalities.

In the case of the slave OSs 126, the OS specific ROM includes the OS identifiers used by the master OS 122 to identify each slave OS 126. The master OS 122 uses these slave OS identifiers, for example, to dispatch the APDUs to the correct slave OS 126. The OS specific ROM 144 for the slave OSs 126 also includes resource control functionalities and information such as, for example, the size of the programmable memory 146, as well as OS switch mechanism functionalities to receive control from the master OS 122 and to transfer control back to the master OS 122.

In one embodiment, the programmable memory 146 is an electrically erasable programmable ROM (EEPROM), although other embodiments may use different types of programmable memory. For convenience in describing embodiments herein, references to the EEPROM 146 are understood to represent corresponding descriptions of other types of programmable memory devices. In one embodiment, the EEPROM 146 is a single memory device that is subdivided into separate memory segments separated by hardware firewalls 130. In another embodiment, the EEPROM 146 may include multiple separate memory devices. In general, each segment of the EEPROM 146 contains information specific to the corresponding master and slave OSs 122 and 126, regardless of whether the segments are implemented in the same or distinct memory devices.

In the case of the master OS 122, the EEPROM 146 includes SSD data, key set, personal identification number (PIN), DAP key, and other similar information. The EEPROM 146 for the master OS 122 also includes the applications 116, application data, application privileges, indication of the default application 116 for the master OS 122, as well as lifecycles information. The EEPROM 146 for the master OS 122 also includes the GlobalPlatform (GP) registry, including application identifier (AID), OS owner of the application, application data and protocol settings related to the communication protocols (e.g., ISO/IEC 14443, ISO/IEC 7816, and USB).

In the case of the slave OSs 126, the EEPROM 146 includes SSD data, key set, PIN, DAP key, and other similar information. The EEPROM 146 for the slave OSs 126 also includes the applications 116, application data, application privileges, indication of the default application 116 for the corresponding slave OSs 126, as well as lifecycles information. The EEPROM 146 for the slave OSs 126 also includes the GP registry, including application identifiers, application locations, application data locations, application resources tables, and so forth.

In one embodiment, the OS specific RAM 148 is a single memory device that is subdivided into separate memory segments separated by hardware firewalls 130. In another embodiment, the OS specific RAM 148 may include multiple separate memory devices. In general, each segment of the OS specific RAM 148 contains information such as the local context specific to the corresponding master and slave OSs 122 and 126, regardless of whether the segments are implemented in the same or distinct memory devices.

In the case of the master OS 122, the OS specific RAM 148 includes session keys, local data processing, and protocol handling information. In the case of the slave OSs 126, the OS specific RAM 148 includes session keys, and local data processing information.

The Common RAM 150 contains the APDU buffer and the messages exchanged between applications.

FIG. 5 illustrates an example of the transfer of control between the master OS 122 and the first slave OS1 within the multiple application smart card 102 of FIG. 3. As described above, the APP1 of the first slave OS1 can communicate with an external device 134 (refer to FIG. 3) by way of the master OS 122. More specifically, the APP1 of the first slave OS1 communicates a message to the master OS 122, which then communicates the message to the external interface 132 (refer to FIG. 3) for delivery to the external device 134. Similarly, the external interface 132 may receive a message intended for the APP1 of the first slave OS1, in which case the external interface 132 delivers the message to the master OS 122, and then the master OS 122 delivers the message to the first slave OS1. Upon receiving the message, the first slave OS1 dispatches the message to the APP1 of the SSD1. The first slave OS1 may maintain control while waiting for a response from the APP 1. Once the APP1 sends a response message to the first slave OS1, the first slave OS1 dispatches the response message to the master OS 122 and gives control directly back to the master OS 122.

By allowing the master OS 122 to control the internal and external communications of the smart card 102 in this manner, multiple OSs can run one after the other without disrupting each other. In each case, the master OS 122 exclusively manages all communications involving any of the slave OSs 126. Furthermore, each slave OS 126 can only communicate with the master OS 122 and give control back to the master OS 122. So the slave OSs 126 cannot communicate with another slave OS 126 or give control to another slave OS 126.

Figure 7:
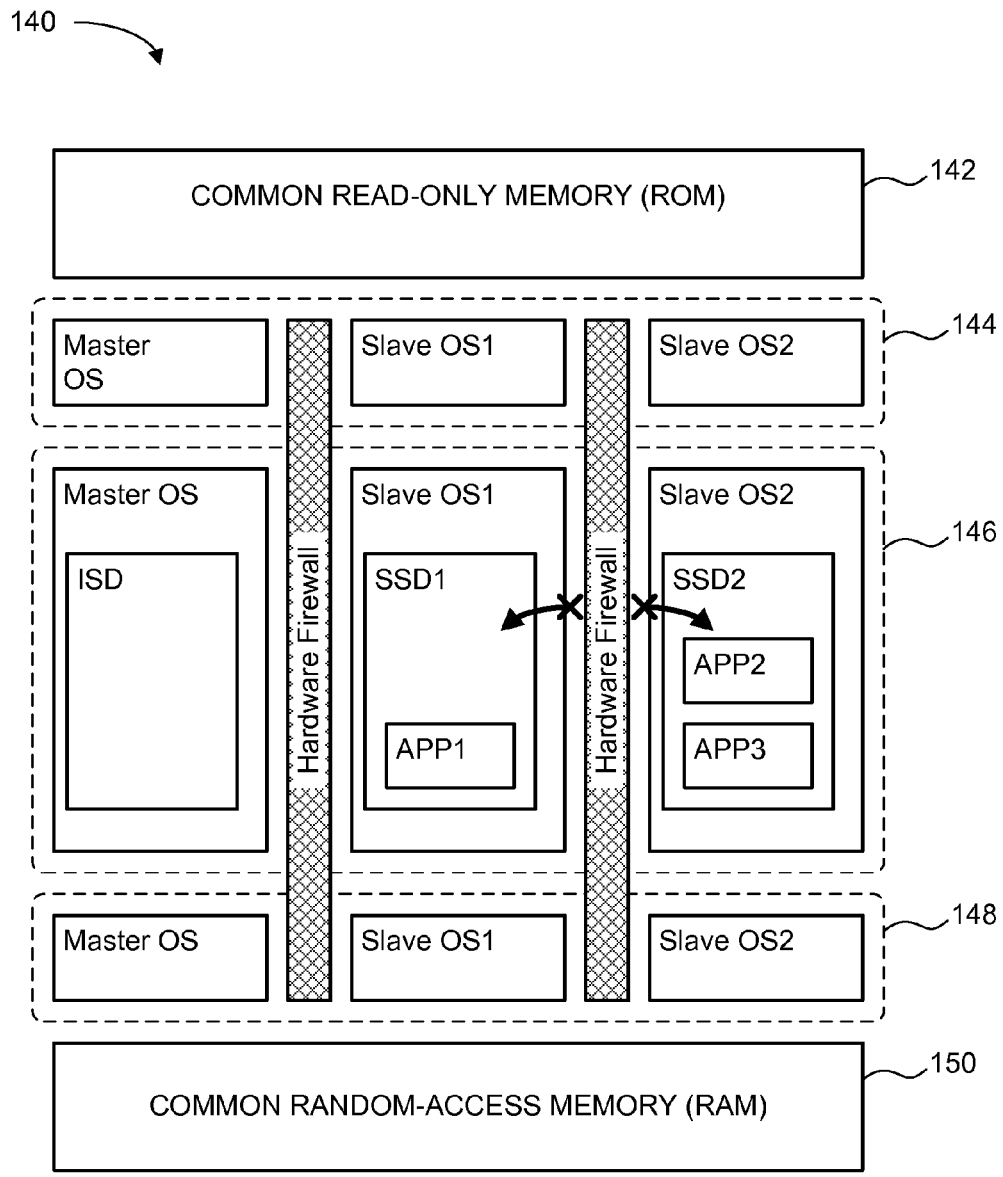
FIG. 7 illustrates an example of a transfer of control that is blocked by the hardware firewall between the first slave OS1 and the second slave OS2 within the multiple application smart card of FIG. 3.

FIG. 6 illustrates an example of the transfer of control between the first slave OS1 and the second slave OS2 within the multiple application smart card 102 of FIG. 3. In the depicted embodiment, the communications between the first and second slave OSs 126 must pass through the master OS 122. This means that all communications between two applications 116 (e.g., between APP1 and APP2) of two SSDs 128 (e.g., SSD1 and SSD2) can only be done via the master OS 122. FIG. 7 illustrates an example of a transfer of control that is blocked by the hardware firewall 130 between the first slave OS1 and the second slave OS2 within the multiple application smart card 102 of FIG. 3.

Figure 8:
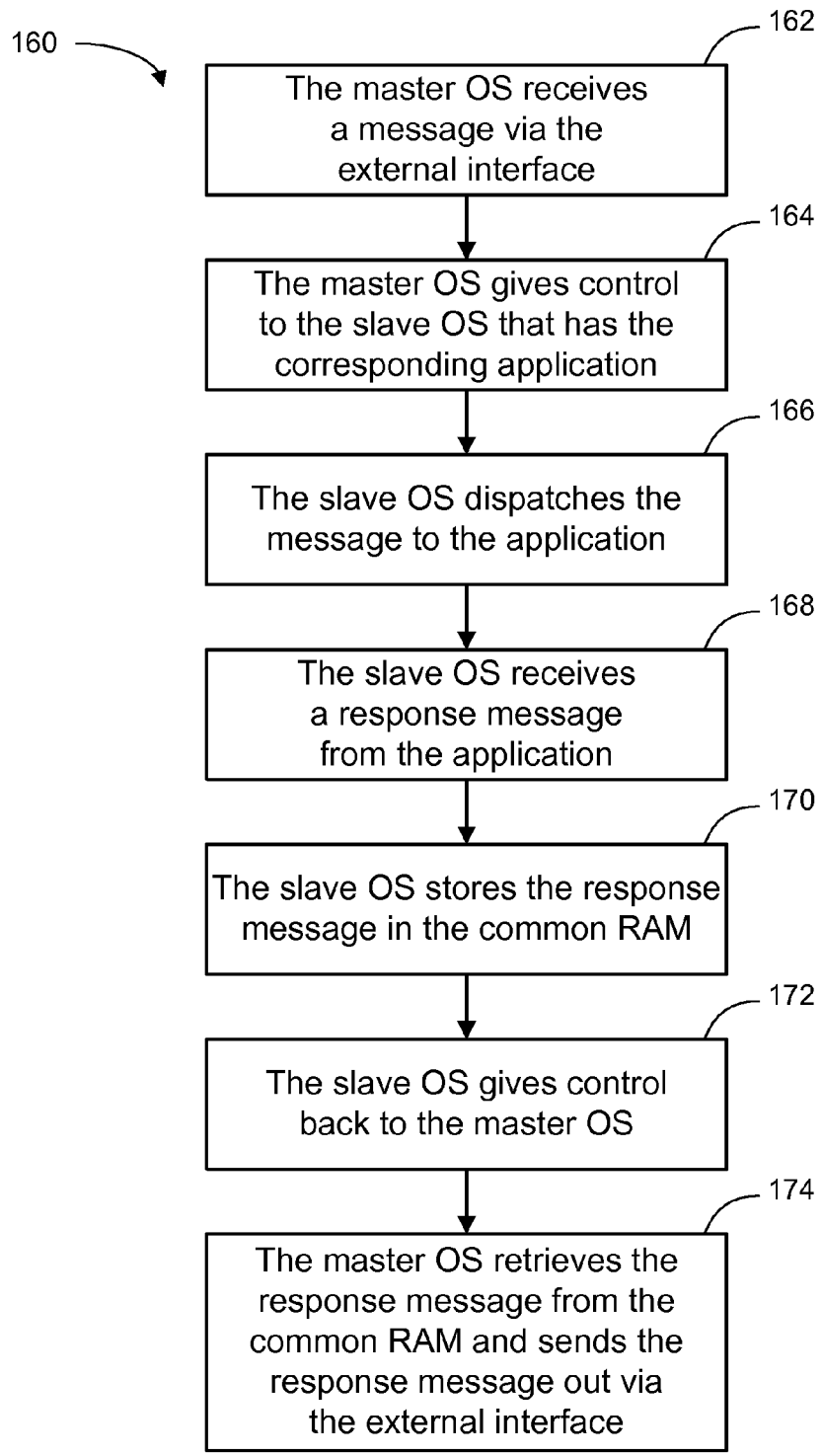
FIG. 8 depicts a flow chart diagram of one embodiment of a method for operating the multiple application smart card of FIG. 3.

FIG. 8 depicts a flow chart diagram of one embodiment of a method 160 for operating the multiple application smart card 102 of FIG. 3. Although the method 160 is described in conjunction with the multiple application smart card 102 of FIG. 1, embodiments of the method 160 may be implemented with other types of multiple application smart cards.

At block 162, the master OS 122 receives a message via the external interface 132. At block 164, the master OS 122 gives control to the slave OS 126 that has the corresponding application 116. At block 166, the slave OS 126 dispatches the message to the application 116 and, in some embodiments, maintains control while waiting for a response message from the application 116. At block 168, the slave OS 126 receives the response message from the application 116. At block 170, the slave OS 126 stores the response message in the common RAM 150. At block 172, the slave OS 126 gives control back to the master OS 122. At block 174, the master OS 122 retrieves the response message from the common RAM 150 and sends the response message out via the external interface 132. The depicted method 160 then ends.

Embodiments described herein can be implemented in any type of multiple application smart card or multiple application smart card controller. Additionally, the functionality of the embodiments described herein may be implemented in addition to other functionality such as security and cryptographic functionality. Also, although many embodiments described herein refer to a smart card, other embodiments may use other types of computer program products which facilitate instances of program instructions on a computer-useable or computer-readable medium. For the purposes of this description, a computer-usable or computer-readable medium can be any apparatus that can contain, store, communicate, propagate, or transport the program for use by or in connection with the instruction execution system, apparatus, or device. As a specific example, a computer-readable storage medium stores the program instructions on a tangible electronic data storage device (e.g., a smart card).

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A memory device for a smart card, the memory device comprising:
   a master memory segment corresponding to a master operating system (OS) and an issuer security domain (ISD);
   a first slave memory segment corresponding to a first slave OS and a first supplemental security domain (SSD), wherein the first slave OS is configured to exclusively communicate with the master OS; and
   a second slave memory segment corresponding to a second slave OS and a second SSD, wherein the second slave OS is configured to exclusively communicate with the master OS,
   wherein the master OS, the first slave OS, and the second slave OS operate independently, and wherein the first slave OS and corresponding first SSD and the second slave OS and corresponding second SSD are reserved for distinct service providers.

2. The memory device of claim 1, wherein the master OS has exclusive control over communications involving at least one slave OS of the first slave OS and the second slave OS.

3. The memory device of claim 1, further comprising a hardware firewall separating the first slave OS of the first slave memory segment and the second slave OS of the second slave memory segment, wherein the hardware firewall prevents direct communications between the first slave OS and the second slave OS.

4. The memory device of claim 1, further comprising a hardware firewall separating the master OS of the master memory segment from both the first slave OS of the first slave memory segment and the second slave OS of the second slave memory segment, wherein the hardware firewall prevents the first slave OS and the second slave OS from accessing the master memory segment.

5. The memory device of claim 1, further comprising a programmable memory device, wherein the programmable memory device comprises the master memory segment, the first slave memory segment, and the second slave memory segment.

6. The memory device of claim 5, wherein the programmable memory device comprises an electrically erasable programmable read only memory (EEPROM) to store application data from different service providers separately in the first and second SSDs.

7. The memory device of claim 5, further comprising:
   an OS specific read-only memory (ROM), wherein the OS specific ROM comprises:
      a master OS ROM to store a communications protocol to manage communications with the first slave OS and the second slave OS; and
      a slave OS ROM for each slave OS, each slave OS ROM to store a unique slave OS identifier for the corresponding slave OS for identification to the master OS; and
   a common ROM coupled to the OS specific ROM, the common ROM (to provide a shared ROM for the master OS, the first slave OS, and the second slave OS.

8. The memory device of claim 5, further comprising:
   an OS specific random-access memory (RAM), wherein the OS specific RAM comprises:
      a master OS RAM to store data processing logic for the master OS; and
      a slave OS RAM for each slave OS, each slave OS RAM to store data processing logic for the corresponding slave OS; and
   a common RAM coupled to the OS specific RAM, the common RAM to store messages exchanged between applications of different security domains.

9. The memory device of claim 1, further comprising a coupling to an external interface, the external interface to allow communications between the master OS and an external device, wherein the master OS controls all of the communications between each slave OS and the external device.

10. A smart card comprising:
a first application from a first service provider stored within a first supplemental security domain (SSD) of a memory device;
a second application from a second service provider stored within a second SSD of the memory device;
a hardware firewall between the first and second applications of the first and second SSDs, the hardware firewall to prevent direct data access between the first and second applications of the first and second SSDs;
a master operating system (OS) for an issuer security domain (ISD) within the memory device, the master OS corresponding to an issuer of the smart card;
a first slave OS for the first SSD; and
a second slave OS for the second SSD,
wherein the master OS, the first slave OS, and the second slave OS operate independently.

11. The smart card of claim 10,
wherein the master OS is configured to have exclusive authority to pass control to either of the first and second slave OSs, and the first and second slave OSs have restricted authority to only pass the control back to the master OS.

12. The smart card of claim 11, further comprising another hardware firewall to isolate the master OS and the ISD from the first and second SSDs to prevent data access of the ISD from either of the first and second SSDs.

13. The smart card of claim 12, wherein the memory device comprises:
a programmable memory device to store the first and second applications in the first and second SSDs, respectively, separated by the hardware firewall;
an OS specific read-only memory (ROM) separated by the hardware firewalls into a master OS ROM for the master OS, a first slave OS ROM for the first slave OS, and a second slave OS ROM for the second slave OS; and
an OS specific random-access memory (RAM) separated by the hardware firewalls into a master OS RAM for the master OS, a first slave OS RAM for the first slave OS, and a second slave OS RAM for the second slave OS.

14. The smart card of claim 13, wherein the memory device further comprises:
a common ROM shared by the master OS, the first slave OS, and the second slave OS; and
a common RAM shared by the master OS, the first slave OS, and the second slave OS.

15. The smart card of claim 11, wherein the master OS is further configured to control all internal communications between the first and second applications within the first and second SSDs.

16. The smart card of claim 11, further comprising an external interface coupled to the memory device, the external interface to allow communications between the master OS and an external device.

17. The smart card of claim 16, wherein the master OS is further configured to exclusively control:
all communications between the first slave OS and the external interface; and
all communications between the second slave OS and the external interface.

18. A method for managing control within a smart card, the method comprising:
establishing control by a master OS implemented on a master memory segment of a memory device;
passing the control from the master OS to a selected slave OS for execution of an application operation by the selected slave OS, wherein the selected slave OS comprises one of a plurality of slave OSs implemented on corresponding slave memory segments of the memory device, wherein the slave memory segments are separated from one another and from the master memory segment by hardware firewalls; and
passing the control from the selected slave OS directly and exclusively back to the master OS subsequent to the execution of the application operation by the selected slave OS,
wherein the master OS and each one of the plurality of slave OSs operate independently, and wherein each one of the plurality slave OSs and corresponding slave memory segments of the memory device are reserved for distinct service providers.

19. The method of claim 18, further comprising facilitating a communication between a first slave OS and a second slave OS of the plurality of slave OSs by:
passing the control from the master OS to the first slave OS;
dispatching a message from a first application in a first supplemental security domain (SSD) of the first slave OS to the master OS;
passing the control back to the master OS;
sending the message from the master OS to the second slave OS; and
dispatching the message to a second application in a second SSD of the second slave OS.

20. The method of claim 18, further comprising facilitating a communication between an external device and a first slave OS by:
receiving a message at the master OS, wherein the message is intended for a first application;
identifying the first slave OS as having a first supplemental security domain (SSD) with the first application;
dispatching the message from the master OS to the a first slave OS;
passing control to the first slave OS;
dispatching the message from the first slave OS to the first application in the first SSD;
receiving a response message at the first slave OS from the first application;
dispatching the message from the first slave OS to the master OS;
passing the control back to the master OS; and
sending the message from the master OS to the external interface.

* * * * *